Aug. 29, 1967

J. VAN GEEN 3,339,159

MICROWAVE CAVITY HAVING A PLURALITY OF
SELECTIVELY SWITCHED CAPACITORS

Filed Sept. 7, 1965

INVENTOR.

JOHN VAN GEEN

BY HIS ATTORNEYS

HARRIS, KIECH, RUSSELL & KERN

United States Patent Office 3,339,159
Patented Aug. 29, 1967

3,339,159
MICROWAVE CAVITY HAVING A PLURALITY OF SELECTIVELY SWITCHED CAPACITORS
John Van Geen, Sunnyvale, Calif., assignor to Pacific Industries, Inc., San Fernando, Calif., a corporation of California
Filed Sept. 7, 1965, Ser. No. 485,179
5 Claims. (Cl. 333—83)

This invention relates to tunable microwave cavities and, in particular, to a new and improved device in which the resonance frequency may be quickly an accurately changed from one value to another.

In a typical microwave cavity, a member or plunger is mounted in one wall for movement toward and away from a reentrant member on the opposite wall. The resonance frequency of the cavity is varied by moving the plunger thereby varying the spacing between the plunger and the reentrant member. A cavity may have a tuning range in the order of ten to one which requires considerable movement of the plunger for covering the entire range. Typically, the plungers are driven by a lead screw arrangement and may be rotated manually or by an electric drive motor. Ease in accurately positioned the plunger calls for a low pitch on the lead screw while speed in moving from one setting to another calls for a high pitch so that the design of any particular cavity represents a compromise depending upon the principal use for which the cavity is constructed.

It is an object of the present invention to provide a new and improved tunable microwave cavity which can be quickly and accurately changed from one resonance frequency to another. A further object is to provide such a device which can be repeatedly changed from one resonance frequency to another without requiring tuning each time. A particular object of the invention is to provide such a device in which the desired resonance frequency can be obtained by merely actuating a switch.

It is an object of the invention to provide a tunable microwave cavity having a plurality of capacitors mounted thereon and means for selectively electrically connecting each of the capacitors between surfaces of the cavity for selecting each of a plurality of predetermined resonance frequencies. A further object is to provide such a device in which each of the capacitors is a variable element which can be adjusted to provide a desired resonance frequency.

It is an object of the invention to provide a tunable microwave cavity having a selector switch positioned therein for selectively electrically connecting each of a plurality of capacitors between surfaces of the cavity, typically a reentrant surface and an opposing surface. A further object is to provide such a structure wherein the moving arm of the switch is connected to one surface and the capacitors are mounted between the fixed contacts of the switch and an opposing surface of the cavity.

The invention also comprises novel combinations and arrangements of parts which will more fully appear in the course of the following description. The drawing merely shows and the description merely describes a preferred embodiment of the present invention which is given by way of illustration or example.

Figure 1:
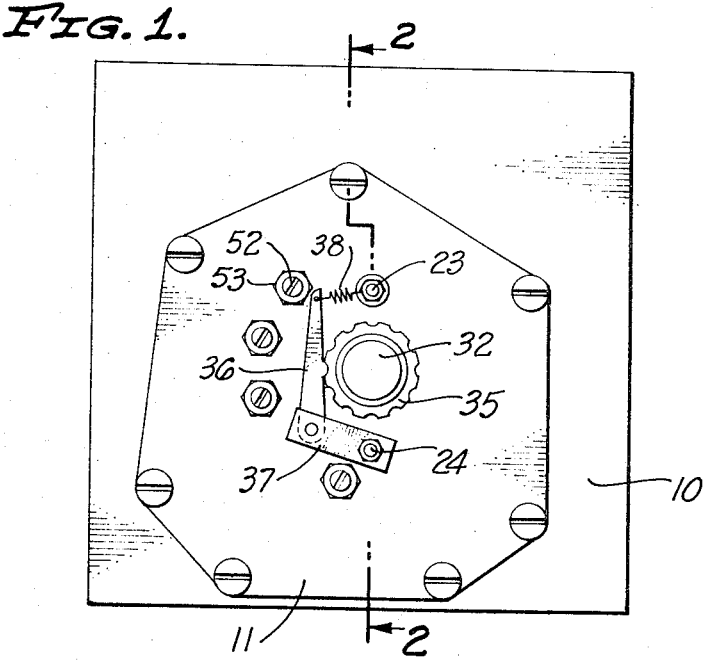
FIG. 1 is a front view of the exterior of a preferred embodiment of the tunable cavity of the invention.
Figure 2:
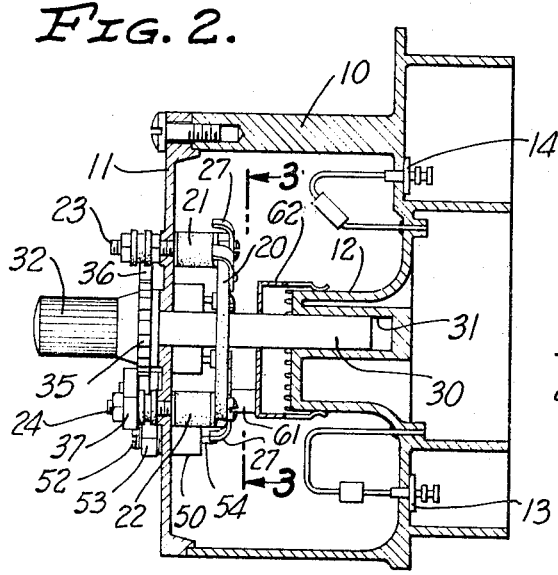
FIG. 2 is a sectional view taken along the line 2—2 of FIG. 1.
Figure 3:
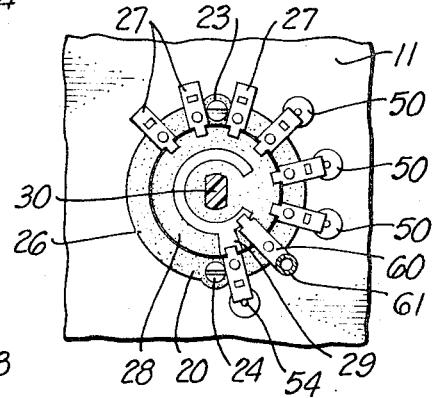
FIG. 3 is a partial sectional view taken along the line 3—3 of FIG. 2.

In the embodiment illustrated, the cavity is formed of two castings, a body member 10 and a cover member 11. The interior is typically cylindrical with a reentrant portion 12. The particular shape of the cavity is not an essential feature of the invention and various shapes may be used as desired. A feedthrough connector 13 mounted in the body 10 provides for an input coupling to the cavity and a similar feedthrough connector 14 provides for an output coupling. Of course, various conventional couplings and connectors can be utilized as desired.

A switch, which may be a conventional wafer switch 20, is mounted on the cover 11 on standoffs 21, 22 with screws 23, 24. The switch 20 includes a fixed member 26 having a plurality of fixed contacts 27 thereon, and a moving member 28 having a moving contact 29. The moving member 28 is driven by a shaft 30 which may be journalled in an opening 31 in the reentrant portion 12, with the shaft projecting through the cover 11 for actuation by a knob 32 or other suitable means.

A detent mechanism is utilized on the switch for accurately positioned the moving member at each of the fixed contacts. A typical detent mechanism is illustrated and includes a notched wheel 35 carried on the shaft 30. A lever 36 with a cam surface for engaging the notched wheel 35 is pivotally mounted on a support arm 37 which in turn is carried on the switch mounting screw 24. The lever 36 is urged into engagement with the detent wheel 35 by a spring 38 connected between the lever and the switch mounting screw 23.

A plurality of capacitors 50 is mounted between the switch 20 and the cover 11. Any capacitor may be used for this purpose and a preferred form is illustrated herein. The capacitor is cylindrical in form with one end threaded and positioned in a tapped opening in the cover 11 and serving as one terminal. An adjustment screw 52 projects through the cover 11 and is locked in place by a nut 53. The opposite end terminal is a lead 54 which may be connected to a contact 27 of the switch 20.

An electrical connection is made with the moving contact 29 of the switch 20 through a contact 60, a support boss 61, and a spring finger assembly 62, with the spring fingers engaging the reentrant portion 12 of the cavity.

The resonance frequency of the cavity will be dependent upon the size and shape of the cavity and the magnitude of the capacitance between the inner surfaces thereof. The switch 20 permits the selection of any one of a plurality of different values of capacitance providing a substantially instantaneous change in resonance frequency. In a typical installation, the value of each capacitor is chosen to provide one of the desired resonance frequencies. Normally, the capacitance value will have to be trimmed, either by connecting one or more additional capacitors in parallel or by utilizing a variable capacitor. The capacitors illustrated herein are variable and the capacitance value may be varied by means of the screw 52. With the particular arrangement illustrated, the setting of each of the resonance frequencies may be accomplished externally of the cavity after the cavity has been assembled. The resonance frequencies may be changed at any time thereafter without requiring disassembly of the cavity. The mechanism of the invention provides for substantially instantaneous change of resonance frequency to any value throughout the tuning range of the cavity and also permits changing to the exact desired frequency without additional fine tuning.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:
1. A microwave device including in combination:
a microwave cavity;
a plurality of capacitors mounted on said cavity; and means for selectively electrically connecting each of said capacitors between surfaces of said cavity.

2. A microwave device including in combination:
a microwave cavity;
a plurality of capacitors positioned within said cavity; and
electrical switch means for selectively connecting each of said capacitors between surfaces of said cavity.

3. A microwave device including in combination:
a microwave cavity;
a wafer-type switch mounted within said cavity;
a plurality of capacitors connected between fixed contacts of said switch and a wall of said cavity, with the moving contact of said switch connected to an opposite wall of said cavity; and
a switch actuating member projecting from said cavity for actuating said switch to selectively connect each of said capacitors between said opposing walls.

4. A microwave device including in combination:
a reentrant microwave cavity;
a plurality of capacitors positioned within said cavity between the reentrant surface and an opposing surface; and
means for selectively electrically connecting each of said capacitors between said reentrant surface and said opposing surface.

5. A microwave device including in combination:
a microwave cavity;
a plurality of variable capacitors positioned within said cavity, with each capacitor adjusted to provide a predetermined resonance frequency for the cavity; and
means for selectively electrically connecting each of said capacitors between the surfaces of said cavity.

References Cited
UNITED STATES PATENTS
2,565,113   3/1951   Baker _____ 331—96

HERMAN K. SAALBACH, *Primary Examiner.*

L. ALLAHUT, *Assistant Examiner.*